(12) United States Patent
Liljedahl

(10) Patent No.: US 10,025,554 B2
(45) Date of Patent: Jul. 17, 2018

(54) DATA ITEM ORDER RESTORATION (71) Applicant: ARM Limited, Cambridge (GB)

(72) Inventor: Eric Ola Harald Liljedahl, Stockholm (SE)

(73) Assignee: ARM Limited, Cambridge (GB)

( * ) Notice: Subject to any disclaimer, the term of this patent is extended or adjusted under 35 U.S.C. 154(b) by 127 days.

(21) Appl. No.: 15/268,939

(22) Filed: Sep. 19, 2016

(65) Prior Publication Data
US 2018/0081624 A1  Mar. 22, 2018

(51) Int. Cl.
*G06F 9/38* (2018.01)
*G06F 5/14* (2006.01)
*G06F 13/16* (2006.01)

(52) U.S. Cl.
CPC ............ *G06F 5/14* (2013.01); *G06F 13/1626* (2013.01); *G06F 13/1673* (2013.01); *G06F 2205/126* (2013.01)

(58) Field of Classification Search
CPC ..... G06F 5/14; G06F 13/1626; G06F 13/1673
USPC ........................................................ 712/218
See application file for complete search history.

(56) References Cited

U.S. PATENT DOCUMENTS

| | | | | |
|---|---|---|---|---|
| 5,564,056 A * | 10/1996 | Fetterman | ............... | G06F 9/384 712/218 |
| 5,632,023 A * | 5/1997 | White | ................. | G06F 9/30094 712/215 |
| 5,778,245 A * | 7/1998 | Papworth | .............. | G06F 9/3836 712/215 |
| 5,870,579 A * | 2/1999 | Tan | ........................ | G06F 9/3861 712/217 |
| 5,913,059 A * | 6/1999 | Torii | ..................... | G06F 9/3009 712/E9.032 |
| 6,021,488 A * | 2/2000 | Eisen | .................. | G06F 9/30101 712/222 |
| 6,112,019 A * | 8/2000 | Chamdani | ............. | G06F 9/3836 712/214 |
| 7,240,347 B1 * | 7/2007 | Lim | ........................ | H04L 45/62 370/392 |
| 9,817,773 B2 * | 11/2017 | Lim | ..................... | G06F 13/4022 |

* cited by examiner

*Primary Examiner* — Paul R Myers
(74) *Attorney, Agent, or Firm* — Nixon & Vanderhye P.C.

(57) ABSTRACT

An apparatus and a corresponding method for processing a sequence of received data items are disclosed. The processing is performed by multiple processing elements. A reorder buffer comprising multiple slots is used to maintain the order of the received data items, wherein a processing element reserves a next available slot in the reorder buffer before beginning processing the next data item of the sequence of received data items. On completion of the processing a buffer change indicator value is read by the processing element when seeking to insert the processed data item into the reserved slot. If the buffer change indicator changes during the course of the insertion process, this serves as an indication to the processing element that another processing element is modifying the content of the reorder buffer in parallel. A check may be repeated for at least one subsequent already-processed data item, since this latter data item may have become ready to be retired from the reorder buffer.

17 Claims, 5 Drawing Sheets

DATA ITEM ORDER RESTORATION

TECHNICAL FIELD

The present disclosure relates to processing a received sequence of data items. More particularly, it relates to parallelizing the processing on multiple processing elements.

BACKGROUND

When the processing of a received sequence of data items, e.g. packets, is parallelised on multiple processing elements, the completion order of that parallel processing may not automatically correspond to the received order of the sequence of data items. However, preserving the original ordering of the sequence of data items may be important in some contexts, for example some network protocols do not handle packet reordering well. Deviations from the original ordering, i.e. late packets, are often treated as lost and retransmission may be requested, which decreases the system throughput and causes extra traffic and processing. In order to maintain the order of the received sequence of data items a reorder buffer (also referred to as a reorder window) may be used, the slots provided in the buffer being used to hold an ordered position for a given received data item while its processing is performed. However, when the technique is extended to a parallelised data processing environment using multiple processing elements the administration of reserving and releasing slots within the buffer will typically employ locking mechanisms, such that access to slots of the buffer by the multiple processing elements is carried out in mutual exclusion to avoid conflict. However, the use of such lock mechanisms does not scale well into a multiple processing element environment. A processing element seeking to complete and release multiple data items (i.e. to transfer the processed data items from the reorder buffer to an egress queue) will potentially prevent other threads from reserving locations in the reorder buffer (which they need to do to be able to start processing a new data item) or from completing and removing their own packets, wasting processing element resources. Indeed, bench marking has even shown negative scalability, wherein throughput decreases as more threads attempt to access the reorder buffer. Conversely, dedicating a single thread to handle the reordering results is likely to result in a single-threaded bottleneck.

SUMMARY

At least one example described herein provides an apparatus comprising: an ingress queue to hold a sequence of received data items; multiple processing elements to perform data processing on the received data items to generate processed data items; a reorder buffer comprising multiple slots; buffer change indicator storage to store a buffer change indicator; and an egress queue to hold a sequence of the processed data items, wherein each processing element is responsive to an available status to reserve a next available slot in the reorder buffer and to start processing a next data item of the sequence of received data items in the ingress queue, wherein each processing element is responsive to completion of processing of the next data item to read a first value from the buffer change indicator storage as a first value and perform an insertion procedure for the processed next data item with respect to the reserved slot, wherein the insertion procedure comprises: when the reserved slot is not a sequentially first reserved slot in the reorder buffer, storing the processed data item to the reserved slot, and attempting to update the buffer change indicator with a new value; and when the reserved slot is the sequentially first reserved slot in the reorder buffer, retiring to the egress queue the processed data item and any further processed data items which are stored in slots which consecutively follow the reserved slot in the reorder buffer, and attempting to update the buffer change indicator with the new value, wherein attempting to update the buffer change indicator with the new value comprises reading a second value from the buffer change indicator storage, and the processing element is responsive to the second value not being equal to the first value to repeat at least the attempting to update the buffer change indicator with the new value step of the insertion procedure.

At least one example described herein provides a method of processing received data items comprising: holding a sequence of the received data items in an ingress queue; performing processing using multiple processing elements on the received data items to generate processed data items, wherein each processing element is responsive to an available status to reserve a next available slot in a reorder buffer comprising multiple slots and to start the performing processing on a next data item of the sequence of received data items in the ingress queue; in each processing element, responsive to completion of processing of the next data item, reading a first value from a buffer change indicator and performing an insertion procedure for the processed next data item with respect to the reserved slot, wherein the insertion procedure comprises: when the reserved slot is not a sequentially first reserved slot in the reorder buffer, storing the processed data item to the reserved slot, and attempting to update the buffer change indicator with a new value; and when the reserved slot is a sequentially first reserved slot in the reorder buffer, retiring to an egress queue for holding a sequence of the processed data items the processed data item and any further processed data items which are stored in slots which consecutively follow the reserved slot in the reorder buffer, and attempting to update the buffer change indicator with the new value, wherein attempting to update the buffer change indicator with the new value comprises reading a second value from the buffer change indicator, and when the second value is not equal to the first value, repeating at least the attempting to update the buffer change indicator with the new value step of the insertion procedure.

At least one example described herein provides an apparatus comprising: means for holding a sequence of received data items in an ingress queue; multiple means for performing processing on the received data items to generate processed data items, wherein each means for performing processing is responsive to an available status to reserve a next available slot in a reorder buffer comprising multiple slots and to start the performing processing on a next data item of the sequence of received data items in the means for holding the sequence of received data items; in each means for performing processing, responsive to completion of processing of the next data item, means for reading a first value from a buffer change indicator and means for performing an insertion procedure for the processed next data item with respect to the reserved slot, wherein the insertion procedure comprises: when the reserved slot is not a sequentially first reserved slot in the reorder buffer, storing the processed data item to the reserved slot, and attempting to update the buffer change indicator with a new value; and when the reserved slot is a sequentially first reserved slot in the reorder buffer, retiring to an egress queue for holding a sequence of the processed data items the processed data item and any further processed data items which are stored in slots which consecutively follow the reserved slot in the reorder buffer, and attempting to update the buffer change indicator with the new value, wherein attempting to update the buffer change indicator with the new value comprises reading a second value from the buffer change indicator, and when the second value is not equal to the first value, repeating at least the attempting to update the buffer change indicator with the new value step of the insertion procedure.

BRIEF DESCRIPTION OF THE DRAWINGS

The present techniques will be described further, by way of example only, with reference to embodiments thereof as illustrated in the accompanying drawings, in which.

DESCRIPTION OF EXAMPLE EMBODIMENTS

In some example embodiments there is an apparatus comprising: an ingress queue to hold a sequence of received data items; multiple processing elements to perform data processing on the received data items to generate processed data items; a reorder buffer comprising multiple slots; buffer change indicator storage to store a buffer change indicator; and an egress queue to hold a sequence of the processed data items, wherein each processing element is responsive to an available status to reserve a next available slot in the reorder buffer and to start processing a next data item of the sequence of received data items in the ingress queue, wherein each processing element is responsive to completion of processing of the next data item to read a first value from the buffer change indicator storage as a first value and perform an insertion procedure for the processed next data item with respect to the reserved slot, wherein the insertion procedure comprises: when the reserved slot is not a sequentially first reserved slot in the reorder buffer, storing the processed data item to the reserved slot, and attempting to update the buffer change indicator with a new value; and when the reserved slot is the sequentially first reserved slot in the reorder buffer, retiring to the egress queue the processed data item and any further processed data items which are stored in slots which consecutively follow the reserved slot in the reorder buffer, and attempting to update the buffer change indicator with the new value, wherein attempting to update the buffer change indicator with the new value comprises reading a second value from the buffer change indicator storage, and the processing element is responsive to the second value not being equal to the first value to repeat at least the attempting to update the buffer change indicator with the new value step of the insertion procedure.

The present techniques provide a lock-free design which improves scalability because the operations to be carried out by the multiple processing elements to reserve a slot in the reorder buffer and subsequently to insert a processed data item into the reserved slot can execute independently of one another. Indeed, different threads (being executed on the different processing elements) can also execute insertion operations concurrently and only thereafter resolve any conflicts when updating shared metadata. This metadata in particular, as provided by the present techniques, comprises the use of a buffer change indicator to enable the lock-free implementation. Modification of the metadata enables synchronisation between concurrent insertion operations.

One issue which is addressed by the present techniques relates to an "in-order" insertion operation, i.e. where the thread performing the in-order insertion operation is inserting a processed data item at the sequentially first reserved slot in the reorder buffer. The thread will therefore retire that processed data item from the reorder buffer to the egress queue and furthermore seek to retire any further completed data items associated with reserved slots which immediately follow. However the present techniques have recognised that this thread should be notified about the addition of newly completed processed data items (waiting to be retired in subsequent reserved slots) which have only completed since the in-order insertion began. Thus a different thread performing an "out-of-order" operation must therefore notify the thread performing the in-order insertion of the newly completed (waiting) data item which may need to be handled (i.e. also retired) by that thread. The present techniques enable the synchronisation between the concurrent insertion operations by the provision of a buffer change indicator, which the processing element (thread) carrying out an insertion operation reads at the beginning of that insertion operation. At a potential completion of that insertion operation it then seeks to update the buffer change indicator with a new value, at which point it also determines if the value of the buffer change indicator has changed since it was initially read at the beginning of the insertion operation. Accordingly, on the one hand a lack of change of the buffer change indicator indicates to the thread carrying out the insertion operation that no other thread has modified the content of the buffer whilst the insertion operation has been proceeding, but on the other hand the modification of the buffer change indicator (on completion of the insertion operation) serves as a signal to another thread that the buffer content has been modified. In the situation where, at a potential completion of an insertion operation, the thread finds that the buffer change indicator has been modified the approach provided by the present techniques is to cause that thread to repeat a portion of the insertion operation, since there may potentially be a newly completed data item waiting to be retired which the thread can carry out. Eventually, when the updating of the buffer change indicator is successful (it having not been modified during the course of the latest iteration of the insertion operation by another thread), the insertion operation is complete.

This action of seeking to update the buffer change indicator may be implemented in a variety of ways, but in some embodiments the attempting to update the buffer change indicator with the new value comprises a compare-and-swap operation which atomically: reads the second value from the buffer change indicator storage, compares the second value to the first value, and when the second value is equal to the first value updates the buffer change indicator with the new value, and when the second value is not equal to the first value updates the first value with the second value.

Accordingly the compare-and-swap operation, in comparing the first value of the buffer change indicator (read at the beginning of the insertion operation) and the second value (read when seeking to update the buffer change indicator at a potential completion point of the insertion operation), enables the updating of the buffer change indicator only to take place when these two values are equal, thus meaning that no modification to the buffer change indicator has taken place during this period between the reading of the first value and the second value. Further, the atomic nature of the compare-and-swap operation ensures that this reading, comparing and updating cannot be corrupted by another concurrent operation. However, the compare-and-swap operation will also update the first value with the second value when the two are found not to be equal thus providing a new "snapshot" of the buffer change indicator, such that the further attempt to update the buffer change indicator which will be carried out can then determine whether, in this latter period between the revised reading of the buffer change indicator and the further attempt to update the buffer change indicator, any further modification of the buffer content by another thread has occurred. This process can continue indefinitely until the thread determines that no modification to the buffer content has changed and its own updating of the buffer change indicator can take place.

In some embodiments the apparatus comprises tail pointer storage to store a tail pointer indicative of the next available slot in the reorder buffer and reserving the next available slot in the reorder buffer comprises atomically reading the tail pointer to identify the next available slot and then incrementing the tail pointer. The provision of this tail pointer, which is atomically read and updated (incremented) by one of the processing elements thus provides a mechanism for uniquely allocating the slots in the reorder buffer in sequence to processing elements which become available to perform processing a data item, without conflict between processing elements for any given slot. It should be noted that "incremented" is intended herein to mean a unit modification of a value and, by convention, this may be by addition (e.g. addition by one). However, an increase is not essential and this "incrementing" could equally well be chosen to be implemented by a decrease (e.g. subtraction by one).

In some embodiments the apparatus comprises head pointer storage to store a head pointer indicative of the sequentially first reserved slot in the reorder buffer, wherein the head pointer is incremented when each processed data item is retired to the egress queue. The provision of this head pointer thus provides a mechanism for tracking the sequentially-first data item which has been received but is still undergoing processing, and must therefore be the first data item to be retired from the reorder buffer to the egress.

In some such embodiments the head pointer and the buffer change indicator are read atomically together. This association of the head pointer and the buffer change indicator thus further enhances the approach of the present techniques, since ensuring that the head pointer and the buffer change indicator can only be read atomically together means that the modification of either can be used as a signalling mechanism between concurrent insertion operations.

For example, in some embodiments the first value further comprises the head pointer value and the second value further comprises the head pointer value. Accordingly, the determination which a thread makes when attempting to update the buffer change indicator, and checking if the buffer change indicator has been modified, further includes determining if the head pointer has been modified in the same period. This therefore provides a mechanism for an out-of-order insertion operation to be notified that the head pointer has been modified by an in-order insertion operation whilst the out-of-order insertion operation has been in progress. This is useful because in the situation where the head pointer has changed and now matches the slot into which the out-of-order insertion operation began its procedure, this out-of-order insertion operation has in fact now become an in-order insertion, i.e. it is completing for a processed data item which now is the sequentially first data item which has been received and has completed processing. Accordingly, the processing element (thread) handling this out-of-order insertion operation which became an in-order insertion operation can then continue to immediately retire this processed data item and indeed any further subsequent waiting data items which have previously completed.

Similarly, in some embodiments the processing element is responsive to the second value not being equal to the first value, and when the reserved slot is now the sequentially first reserved slot in the reorder buffer, to retire to the egress queue the processed data item and any further processed data items which are stored in slots which consecutively follow the reserved slot in the reorder buffer, before repeating the attempt to update the buffer change indicator with the new value. Thus, in the situation in which a processing element which has completed processing of a data item finds, on a reattempt of the update of the buffer change indicator that it is now the sequentially first reserved slot in the reorder buffer, that processing element will immediately retire the corresponding processed data item to the egress queue (and any further processed data items which are stored in slots which consecutively follow).

The new value of the buffer change indicator with which the processing element seeks to update the buffer change indicator may be generated in a variety of ways. Of significance to the present techniques is only the fact that it is assured to be different to the existing value of the buffer change indicator, to thus enable the modification of the content of the buffer by a concurrent process always to be noticed. In some embodiments the processing element is responsive to completion of processing of the next data item to calculate the new value of the buffer change indicator as a slot number of the reserved slot. Since the slot number of the data item being processed by the processing element is assured to be unique (by virtue of the unique allocation of slots to data items for processing), this provides one such mechanism.

Alternatively, in some embodiments each processing element is responsive to completion of processing of the next data item to calculate the new value of the buffer change indicator as an incremented value of the first value. Incrementing the value (the first value) of the buffer change indicator read at the beginning of the insertion operation thus provides a further mechanism for generating a different buffer change indicator value as required. Again, it should be appreciated here that the use of the term "incremented" is again intended in the general sense of amending the value by one unit (whether the convention has been chosen for this to be by addition or subtraction).

A further alternative mechanism for maintaining the buffer change indicator is provided in some embodiments in which the buffer change indicator is a count of reserved slots in the reorder buffer and each processing element is responsive to completion of processing of the next data item to: increment the count when the reserved slot is not the sequentially first reserved slot in the reorder buffer; and decrement the count when the reserved slot is the sequentially first reserved slot in the reorder buffer. Modification of this counter is thus dependent on whether or not the reserved slot is found to be the sequentially first reserved slot. If it is not then the count is incremented (indicating the greater number of occupied slots in the reorder buffer) and when it is the sequentially first reserved slot (which is therefore retired and this slot thus released and made available) the count is decremented.

In some embodiments the apparatus may be provided with only a single egress queue and ultimately all data items received at the ingress queue will be transferred (once processed) to that egress queue. However in some embodiments the apparatus comprises multiple egress queues, each egress queue to hold a subset of the processed data items, wherein each processing element is responsive to a destination indicator (for example an IP destination) for a data packet associated with the processed data item to direct the processed data item to a selected egress queue in dependence on the destination indicator when retiring the processed data item in the insertion procedure. Accordingly, the present techniques provide that a destination indicator associated with each data item may indicate different required destinations (e.g. one example of this being where the apparatus is playing the role of a router, directing received data items to appropriate destinations) and thus direct a given processed data item towards it destination via a selected egress queue based on its associated destination indicator.

Indeed, the present techniques further recognise that there may not be a one-to-one correspondence between received data items and destinations in that a given data may be formed of more than one portion, where each portion is required to be forwarded to a different destination. Accordingly, in some such embodiments each processing element is responsive to the processed data item comprising at least two portions and the at least two portions having at least two different destination indicators to direct the portions to respective egress queues in dependence on the at least two different destination indicators when retiring the processed data item in the insertion procedure. Thus, at the point where the processing element seeks to retire a processed data item from the reorder buffer, it may split up data item into two or more portions and direct those portions to respective egress queues in order to feed onto the required different destinations.

In general the multiple processing elements will take on received data items for processing from the egress queue in the order in which those processing elements become available to perform data item processing, but the present techniques further recognise that even this process of de-queuing data items from the ingress queue could, under certain circumstances, present a possibility for the order of the received sequence of data items to be disrupted. For example, consider the situation in which, when a first processing element becomes available, it reserves the next available slot in the re-order buffer but is interrupted before it can de-queue the next received data item from the ingress queue. Then the possibility arises for a subsequent processing element to become available, reserve a further next available slot in the reorder buffer, and then to take the received data item which should have been taken by the first processing element to occupy that slot (since this is the oldest data item it encounters in the ingress queue) and begin its data item processing, thus switching the order of these two data items. To address this issue, in some embodiments the apparatus further comprises storage for a dequeue serialization value, wherein, in each processing element, reserving the next available slot in the reorder buffer further comprises storing as an allocated slot number the identified next available slot, wherein each processing element is responsive to the dequeue serialization value being different to the allocated slot number to delay dequeuing the next data item from the ingress queue; and wherein each processing element is responsive to the dequeue serialization value being equal to the allocated slot number to dequeue the next data item from the ingress queue and to update the dequeue serialization value. Accordingly, each processing element must therefore wait until the allocated slot number which it is seeking to reserve whilst processing a data item taken from the ingress queue matches the dequeue serialization value. Moreover, the dequeue serialization value is only updated once a processing element has successfully dequeued the next data item from the ingress queue, thus ensuring that the above-described violation of the order of the received data items cannot occur.

This updating of the dequeue serialization value could be implemented in a variety of ways, but in some embodiments updating the dequeue serialization value comprises incrementing the dequeue serialization value. Again, the same comments made above with respect to the meaning of incrementing apply here i.e. by convention this may be chosen to be a numerical increase of the dequeue serialization value, but it could equally be implemented by means of a numerical decrease. The only constraint is that the dequeue serialization value is incremented in the same manner as allocated slot numbers.

In some embodiments updating the dequeue serialization value comprises updating the dequeue serialization value with an incremented slot number. Accordingly, the final act of the processing element in dequeueing the data item to a given slot number is to update the dequeue serialization value with the next slot number (i.e. the incremented slot number) thus indicating to the processing element waiting for that incremented slot number that it can now dequeue the next data item in the ingress queue to that slot.

In some example embodiments there is a method of processing comprising: holding a sequence of the received data items in an ingress queue; performing processing using multiple processing elements on the received data items to generate processed data items, wherein each processing element is responsive to an available status to reserve a next available slot in a reorder buffer comprising multiple slots and to start the performing processing on a next data item of the sequence of received data items in the ingress queue; in each processing element, responsive to completion of processing of the next data item, reading a first value from a buffer change indicator and performing an insertion procedure for the processed next data item with respect to the reserved slot, wherein the insertion procedure comprises: when the reserved slot is not a sequentially first reserved slot in the reorder buffer, storing the processed data item to the reserved slot, and attempting to update the buffer change indicator with a new value; and when the reserved slot is a sequentially first reserved slot in the reorder buffer, retiring to an egress queue for holding a sequence of the processed data items the processed data item and any further processed data items which are stored in slots which consecutively follow the reserved slot in the reorder buffer, and attempting to update the buffer change indicator with the new value, wherein attempting to update the buffer change indicator with the new value comprises reading a second value from the buffer change indicator, and when the second value is not equal to the first value, repeating at least the attempting to update the buffer change indicator with the new value step of the insertion procedure.

In some example embodiments there is an apparatus comprising means for holding a sequence of received data items in an ingress queue; multiple means for performing processing on the received data items to generate processed data items, wherein each means for performing processing is responsive to an available status to reserve a next available slot in a reorder buffer comprising multiple slots and to start the performing processing on a next data item of the sequence of received data items in the means for holding the sequence of received data items; in each means for performing processing, responsive to completion of processing of the next data item, means for reading a first value from a buffer change indicator and means for performing an insertion procedure for the processed next data item with respect to the reserved slot, wherein the insertion procedure comprises: when the reserved slot is not a sequentially first reserved slot in the reorder buffer, storing the processed data item to the reserved slot, and attempting to update the buffer change indicator with a new value; and when the reserved slot is a sequentially first reserved slot in the reorder buffer, retiring to an egress queue for holding a sequence of the processed data items the processed data item and any further processed data items which are stored in slots which consecutively follow the reserved slot in the reorder buffer, and attempting to update the buffer change indicator with the new value, wherein attempting to update the buffer change indicator with the new value comprises reading a second value from the buffer change indicator, and when the second value is not equal to the first value, repeating at least the attempting to update the buffer change indicator with the new value step of the insertion procedure.

Some particular embodiments will now be described with reference to the figures.

Figure 1:
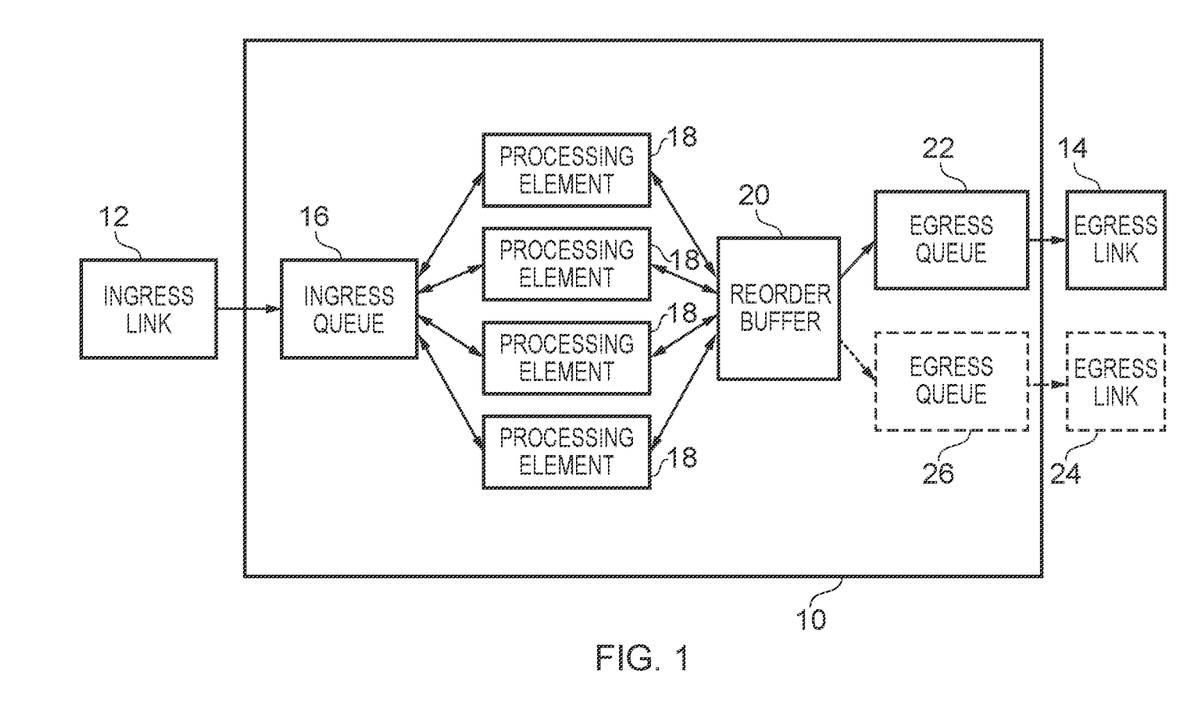
FIG. 1 schematically illustrates an apparatus comprising multiple processing elements for parallelized processing of a sequence of received data items in one embodiment.

FIG. 1 schematically illustrates an apparatus 10 in one embodiment. As can be seen from the figure the apparatus 10 essentially provides a connection between an ingress link 12 and an egress link 14. These links can in principle take a wide variety of forms, but may for example position the apparatus 10 on an IP transport link via which data packets are transmitted, and in this context the apparatus 10 may perform a variety of processing on the data packets which pass through it, as appropriate to the particular position in which it is found. Within the apparatus 10 itself there is an ingress queue 16 in which received data items are queued in the order in which they are received before being allocated for processing to one of the multiple processing elements 18. Note that, as an example, four processing elements 18 are illustrated in the figure, but any multiple number of processing elements might be provided and indeed in some embodiments the apparatus comprises a large number of processing elements 18, for example provided as a set of parallelised CPUs. The apparatus 10 further comprises a reorder buffer 20 which is made use of (as will be described in more detail with reference to the figures which follow) by the apparatus 10 in order to allow the parallelised processing of the data items by the multiple processing elements 18 and yet also ensuring that the order in which the received sequence of data items is received by the apparatus (and held in the ingress queue 16) is maintained when the processed data items are passed on to an egress queue 22 which connects to the egress link 14. Note that FIG. 1 also shows (by means of the dashed line items) a variation on the embodiment in which the apparatus 10 connects to an additional egress link 24 and for this purpose is provided with a second egress queue 26. Hence in such an embodiment the processed data items removed from the reorder buffer 20 are either retired to the egress queue 22 or the egress queue 26 in dependence on the egress link to which that data item should be directed.

Figure 2:
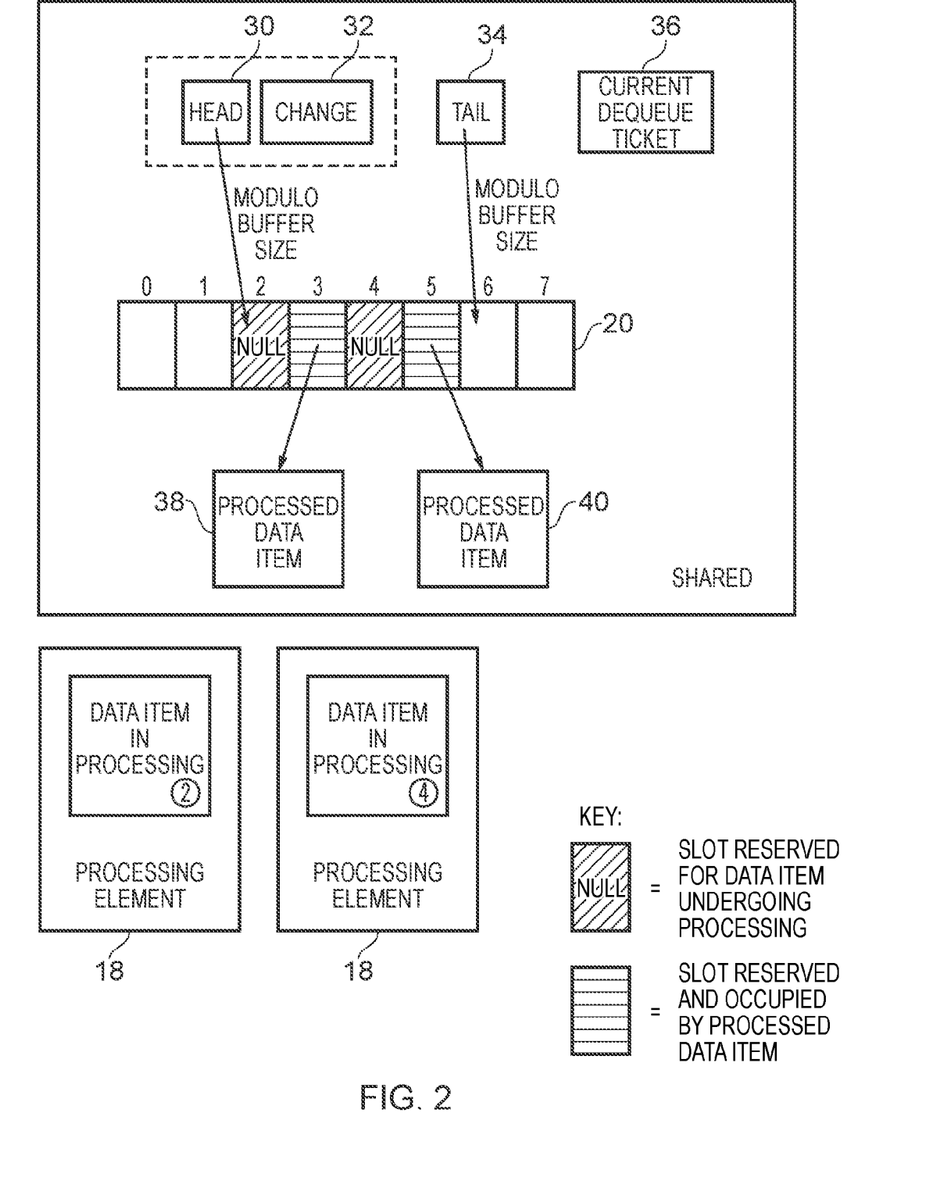
FIG. 2 schematically illustrates further detail of some parts of the apparatus of FIG. 1 in one embodiment.

FIG. 2 illustrates in more detail some parts of the apparatus 10 of FIG. 1, illustrating the manner in which in particular the reorder buffer 20 is used to maintain the order of the received data items. The reorder buffer 20 is illustrated in FIG. 2 as comprising eight slots although this relatively limited number is shown only for clarity of illustration and the reorder buffer may be provided with significantly more slots (typically numbered as a power-of-two). In the upper part of the figure it is illustrated that the apparatus 10 comprises storage for a head pointer 30, a buffer change value 32, a tail pointer 34, and a current dequeue ticket value 36. The head pointer storage 30 is provided to hold a head pointer which indicates the sequentially first slot in the reorder buffer which has been reserved for a data item which is still undergoing processing by one of the processing elements 18. This ongoing processing of a data item associated with the slot #2 in the reorder buffer 20 is shown in the lower part of FIG. 2 where the left hand processing element 18 is illustrated as processing a data item which is labelled with the number 2 indicating the corresponding position held for it in the reorder buffer 20. Similarly, the right hand processing element 18 at the lower part of FIG. 2 is shown during ongoing processing of a data item which is associated with the slot #4 in the reorder buffer 20. Slots in the reorder buffer 20 are reserved sequentially for data items which are dequeued from the ingress queue 16, but because of variability in the time taken for the data items to be processed (due to their size, complexity, interruptions in the processing elements carrying out the processing, and so on) a later received data item may have completed processing in a processing element before a earlier received data item. This is illustrated in FIG. 2 by virtue of the fact that slots #3 and #5 in the reorder buffer 20 are each shown as occupied by a processed data item 38 and 40 respectively. These processed data items 38 and 40 must remain held in the reorder buffer 20 until the as yet unfinished processing of the data items associated with slot #2 and #4 respectively complete.

When a processing element 18 is available to perform processing and a data item is available for processing in the ingress queue 16 the processing element 18 makes use of the values indicated by the tail pointer 34 and the current dequeue ticket value 36 to reserve a slot in the reorder buffer 20 and to dequeue the data item from the ingress queue. This is explained in more detail below with reference to FIG. 3. Thereafter, once processing of the data item has completed, the processing element 18 performs an insertion operation for the processed data item with respect to the reserved slot in the reorder buffer 20. This process involves use of the head pointer 30 and the buffer change indicator 32, as will be described in more detail below with reference to FIG. 4. In brief, when the head pointer 30 indicates that the processed data item which is subject to the insertion operation has been allocated to the slot indicated by the head pointer, this is an in-order insertion operation and the processed data item is directly retired to the egress queue 22. The head pointer is then incremented and if there is a processed data item at the updated head position (i.e. that slot does not contain a 'null') then that next processed data item is now in-order and can also be retired. The head pointer is again incremented and the test re-performed until either the head pointer and the tail pointer indicate the same slot (i.e. the reorder window is now empty) or the indicated position in the reorder buffer is empty (contains a 'null') (i.e. a corresponding data item has not completed processing yet). Conversely, if at the completion of the processing of a data item the reserved slot for this data item does not equal the head pointer position then this is an out-of-order insertion operation and the data item is stored at the corresponding slot position awaiting a later in-order insertion operation that will also find and retire this processed data item. Additionally, as is described in more detail below with reference to FIG. 4, both an in-order and an out-of-order insertion operation make use of the buffer change variable 32, which is accessed atomically with head pointer 30, in order to synchronise between concurrent insertion operations. Finally it will be understood that the reorder buffer 20 it used in a circular fashion, the incrementing slot numbers (and corresponding head and tail pointers) wrapping round in a manner with which one of ordinary skill is familiar.

Figure 3:
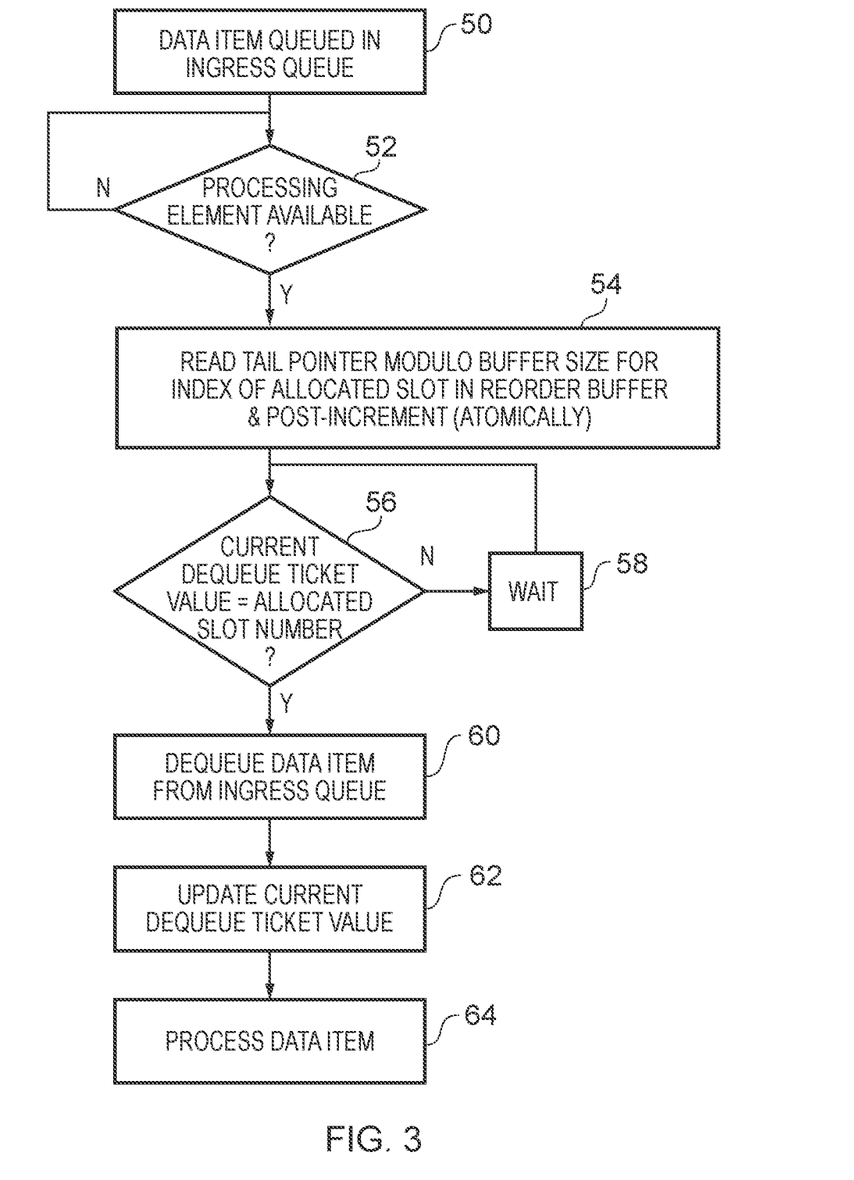
FIG. 3 shows a sequence of steps which are taken in order to transfer a data item from an ingress queue to a processing element for processing, reserving a slot in the reorder buffer in one embodiment.

FIG. 3 shows a sequence of steps which are taken in one embodiment when a data item is present in the ingress queue (and therefore ready to be processed by the apparatus) and an available processing element then reserves a slot in the reorder buffer and begins processing this data item. The first step 50 of FIG. 3 shows the data item queued in the ingress queue and then at step 52 it is determined if a processing element is currently available (i.e. all processing elements are not currently occupied by processing previously received data items). The flow loops on itself here until a processing element is available. Then at step 54 the available processing element reads the tail pointer value in order to determine the next available slot in the reorder buffer. Note that in the example shown in FIG. 2 the tail pointer value is shown as being used modulo the buffer size since in the illustrated example the original pointer value is a 32-bit value whilst the array index (slot number) is between 0 and 7 (although as mentioned above this relatively small number is for clarity of illustration only). It will be recognised that depending on the particular configuration of the tail pointer the value could be used directly itself (indeed configured to directly store an array index). However read, once the tail pointer value has been determined the value stored in the tail pointer 34 is thereafter incremented, the initial reading and subsequent incrementing of this value being performed as an atomic operation to avoid conflict with other processing elements which may be simultaneously seeking access to the tail pointer.

Then at step 56 it is determined if the current dequeue ticket value 36 matches the allocated slot number. If it does not then this means that another processing element is currently dequeueing a data item from the ingress queue and this processing elements waits (step 58) and then retries the comparison at step 56. Once this condition is fulfilled, the processing element then proceeds, at step 60, to dequeue the data item from the ingress queue and, once this is complete, at step 62 the processing element updates the current dequeue ticket value. This updating of the current dequeue ticket value is, in the illustrated embodiment, performed by incrementing the current dequeue ticket value. However, other embodiments are also contemplated, for example where the current dequeue ticket value is replaced by a value which is explicitly linked to the slot number. In this example the current dequeue ticket value can thus be replaced by the allocated slot number plus one, thus indicating that whichever processing element seeks to dequeue a data item with respect to the following slot in the buffer, it will now be able to do so. The steps illustrated in FIG. 3 conclude at step 64 where the processing item, having successfully dequeued the data item from the ingress queue then begins processing of that data item.

Figure 4:
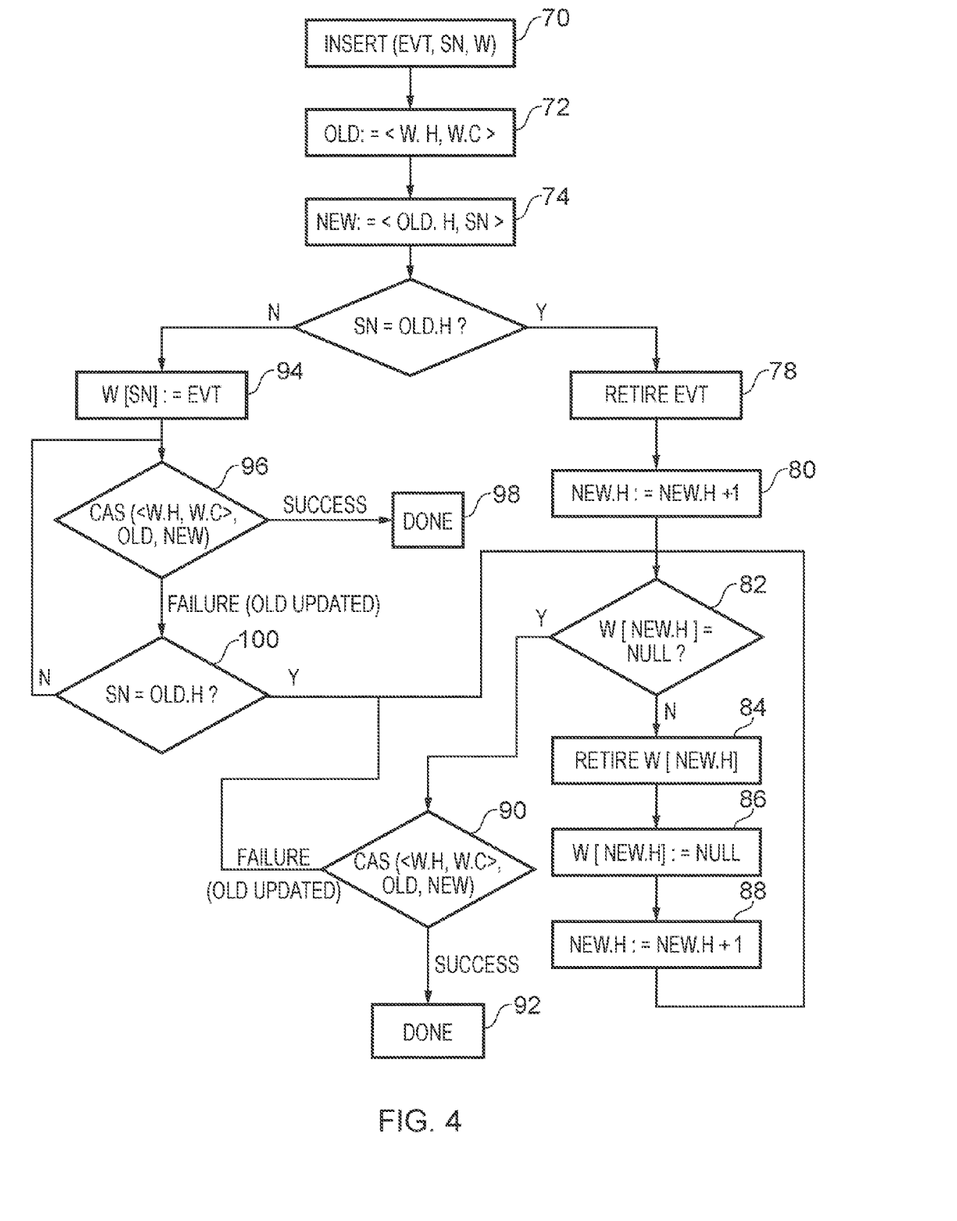
FIG. 4 shows a sequence of steps which are taken when the processing of a data item is complete and a processing element seeks to insert the processed data element into a reserved slot in the reorder buffer in one embodiment.

FIG. 4 shows a sequence of steps which are taken in one embodiment when a processing element seeks to perform an insertion operation for a processed data item with respect to the reorder buffer. The illustrated flow in FIG. 4 begins at step 70 with the insertion operation being invoked with respect to a given data item (EVT), a reserved slot number (SN), and with reference to the reorder buffer ("window") (W). At step 72 the head pointer value (H) and the change buffer indicator value (C) for the buffer (W) are read together are assigned to the variable "OLD". Then at step 74 the variable "NEW" is assigned with a value constructed from the combination of the head pointer value portion of the variable OLD and the reserved slot number. At step 76 it is determined if the reserved slot number (to which this insertion operation is being applied) is the same as the head pointer value (OLD.H). When this is true this means that the insertion operation is being carried out "in order", i.e. the slot which is the subject of the insertion in the reorder buffer is the oldest reserved slot (and therefore the processed data item is also the oldest received data item). Accordingly, this processed data item can then directly be retired to the egress queue (step 78). Then at step 80 a new head pointer value is calculated (by incrementing NEW). It is then tested at step 82 whether the slot pointed to by this new header pointer contains a null or not. If it does not then this slot in the reorder buffer also contains a processed data item (i.e. in the manner shown in FIG. 2, a pointer to a processed data item) and at step 84 this processed data item is also retired to the egress queue. At step 86 the content of this slot in the reorder buffer is "cleared" by storing a null therein and at step 88 the NEW head pointer value is incremented once more. The flow returns to step 82 to test whether this newly incremented head pointer points to a slot in the reorder buffer which can also be retired. Accordingly, the steps 82, 84, 86, and 88 will be iteratively carried out until all processed data items waiting in the reorder buffer, which are not pending the completion of the processing of an earlier data item, can be retired. However, once it is determined at step 82 that the header pointer indicates a slot which contains a null then the flow proceeds to step 90.

At step 90 the processing element attempts a compare-and-swap (CAS) operation with respect to the head pointer and change buffer indicator. This CAS operation compares the current values of the head pointer and change indicator with the "expected" values given by OLD, and if these match then the operation updates the stored values of the head pointer and the change buffer indicator with the values given by NEW. The compare-and-swap operation is atomic, so that this reading, comparing and updating cannot be corrupted by another concurrent thread accessing the same values. Thus, when successful the flow proceeds to step 92 and the insertion operation is complete. However, if the CAS operation at step 90 is not successful, i.e. OLD differs from the current values (of H and C), then the flow returns to step 82. Note that in addition, when the CAS operation at step 90 is not successful that the variable OLD is updated, i.e. taking the current values of the head pointer and the change buffer indicator. This return to the test at step 82 from a failure at step 90 enables the processing element to determine if the modification of the head pointer value and/or the change buffer indicator value by another processing element has also resulted in the slot indicated by the header pointer now being occupied by a processed data item. This being the case then, as described above, this processed data item (and any that immediately follow) can also be retired.

Returning to a consideration of step 76 of the FIG. 4 embodiment of the insertion operation, if it is found that the reserved slot number for the processed data item does not correspond to the head pointer value, then this means that this is an out-of-order insertion operation. In other words, this processed data item is awaiting the completion of the processing of a data item received before it, before it can be retired. Thus, at step 94 the processed data item (EVT) is stored in the reserved slot of the reorder buffer. Then at step 96 the above described compare-and-swap (CAS) operation is attempted. If this is successful then the insertion operation is complete at step 98. If however the CAS operation at step 96 fails, this means that another processing element has modified the head pointer value and/or the change buffer indicator value since these were read into the variable OLD and the flow proceeds to step 100 (noting once more that on this failure the variable OLD is updated with the current values). It is then determined at step 100 whether the reserved sequence number now corresponds to the (updated) head pointer value. Whilst this is not the case the flow returns to step 96, and via the steps 96 and 100 the CAS operation is reattempted until it succeeds. However, if at any iteration the reserved sequence number is found at step 100 to match the head pointer value, this indicates that this out-of-order insertion operation has now become an in-order insertion operation and the flow proceeds to step 82. At this first iteration it will be found that the slot does not contain a null (since this was filled with the newly processed event at step 94) and therefore the processed event is retired at step 84. As described above, any immediately following processed data items are also subsequently retired.

Figure 5A:
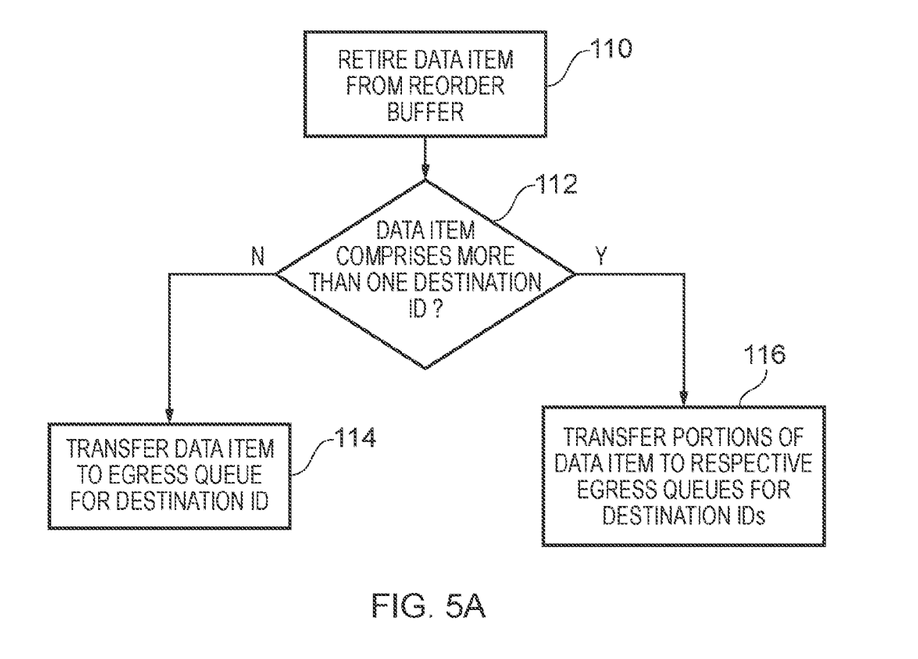
FIG. 5A shows a sequence of steps which are taken when retiring a data item from the reorder buffer in an embodiment in which the apparatus comprises more than one egress queue for processed data items.

FIG. 5A shows a sequence of steps which are taken when retiring a data item from the reorder buffer in an embodiment in which more than one egress queue is provided. The flow begins at step 110 when there is a data item to be retired from the reorder buffer and leads to step 112 where it is determined if the data item comprises more than one destination identifier. If it does not then the flow proceeds to step 114 where the whole data item is transferred to (retired to) the egress queue corresponding to the one destination identifier. However, if at step 112 it is determined that the data item does indeed comprise more than one destination identifier then the flow proceeds to step 116 where the respective portions of the data item are transferred to (retired to) the respective egress queues which are indicated by the multiple destination identifiers.

Figure 5B:
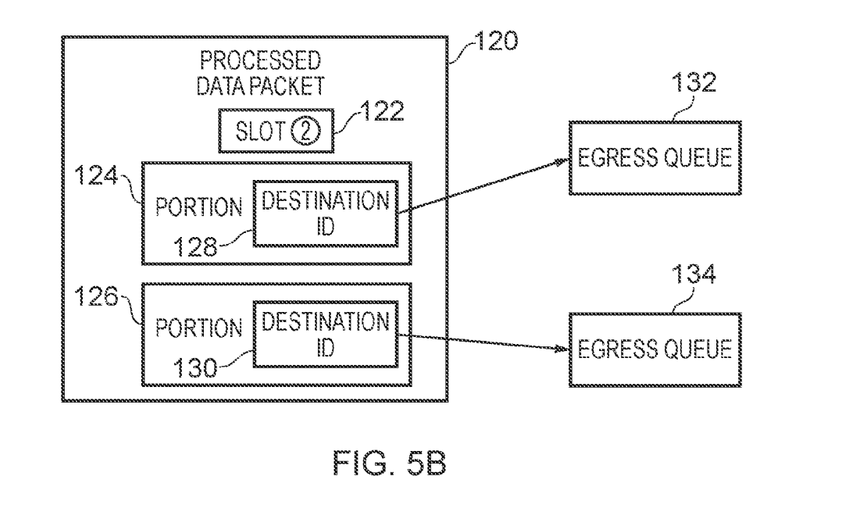
FIG. 5B shows the retirement of two different portions of a processed data item to two different egress queues on the basis of their destination identifiers in one embodiment.

FIG. 5B schematically illustrates the sub-division of a processed data packet 120 in this manner in one embodiment. As illustrated the processed data packet has been labelled as corresponding to slot #2 in the reorder buffer by means of the labelling 122. Once the processing of this data packet is complete it is then identified by the processing element that this processed data packet comprises two portions 124 and 126 each with a respective destination identifier 128 and 130. The destination identifier 128 corresponds to the egress queue 132 and the destination identifier 130 corresponds to the egress queue 134. Accordingly, the portion 124 is retired to the egress queue 132 and the portion 126 is retired to the egress queue 134.

In brief overall summary an apparatus and a corresponding method for processing a sequence of received data items are disclosed. The processing is performed by multiple processing elements. A reorder buffer comprising multiple slots is used to maintain the order of the received data items, wherein a processing element reserves a next available slot in the reorder buffer before beginning processing the next data item of the sequence of received data items. On completion of the processing a buffer change indicator value is read by the processing element when seeking to insert the processed data item into the reserved slot. If the buffer change indicator changes during the course of the insertion process, this serves as an indication to the processing element that another processing element is modifying the content of the reorder buffer in parallel. A check may be repeated for at least one subsequent already-processed data item, since this latter data item may have become ready to be retired from the reorder buffer.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. Apparatus comprising:
   an ingress queue to hold a sequence of received data items;
   multiple processing elements to perform data processing on the received data items to generate processed data items;
   a reorder buffer comprising multiple slots;
   buffer change indicator storage to store a buffer change indicator; and
   an egress queue to hold a sequence of the processed data items,
   wherein each processing element is responsive to an available status to reserve a next available slot in the reorder buffer and to start processing a next data item of the sequence of received data items in the ingress queue,
   wherein each processing element is responsive to completion of processing of the next data item to read a first value from the buffer change indicator storage as a first value and perform an insertion procedure for the processed next data item with respect to the reserved slot,
   wherein the insertion procedure comprises:
      when the reserved slot is not a sequentially first reserved slot in the reorder buffer, storing the processed data item to the reserved slot, and attempting to update the buffer change indicator with a new value; and
      when the reserved slot is the sequentially first reserved slot in the reorder buffer, retiring to the egress queue the processed data item and any further processed data items which are stored in slots which consecutively follow the reserved slot in the reorder buffer, and attempting to update the buffer change indicator with the new value, wherein attempting to update the buffer change indicator with the new value comprises reading a second value from the buffer change indicator storage, and the processing element is responsive to the second value not being equal to the first value to repeat at least the attempting to update the buffer change indicator with the new value step of the insertion procedure.

2. The apparatus as claimed in claim 1, wherein the attempting to update the buffer change indicator with the new value comprises a compare-and-swap operation which atomically:

reads the second value from the buffer change indicator storage, compares the second value to the first value, and when the second value is equal to the first value updates the buffer change indicator with the new value, and when the second value is not equal to the first value updates the first value with the second value.

3. The apparatus as claimed in claim 1, comprising tail pointer storage to store a tail pointer indicative of the next available slot in the reorder buffer and reserving the next available slot in the reorder buffer comprises atomically reading the tail pointer to identify the next available slot and then incrementing the tail pointer.

4. The apparatus as claimed in claim 1, comprising head pointer storage to store a head pointer indicative of the sequentially first reserved slot in the reorder buffer, wherein the head pointer is incremented when each processed data item is retired to the egress queue.

5. The apparatus as claimed in claim 4, wherein the head pointer and the buffer change indicator are read atomically together.

6. The apparatus as claimed in claim 5, wherein the first value further comprises the head pointer value and the second value further comprises the head pointer value.

7. The apparatus as claimed in claim 1, wherein the processing element is responsive to the second value not being equal to the first value, and when the reserved slot is now the sequentially first reserved slot in the reorder buffer, to retire to the egress queue the processed data item and any further processed data items which are stored in slots which consecutively follow the reserved slot in the reorder buffer, before repeating the attempt to update the buffer change indicator with the new value.

8. The apparatus as claimed in claim 1, wherein the processing element is responsive to completion of processing of the next data item to calculate the new value of the buffer change indicator as a slot number of the reserved slot.

9. The apparatus as claimed in claim 1, wherein each processing element is responsive to completion of processing of the next data item to calculate the new value of the buffer change indicator as an incremented value of the first value.

10. The apparatus as claimed in claim 1, wherein the buffer change indicator is a count of reserved slots in the reorder buffer and each processing element is responsive to completion of processing of the next data item to:

increment the count when the reserved slot is not the sequentially first reserved slot in the reorder buffer; and decrement the count when the reserved slot is the sequentially first reserved slot in the reorder buffer.

11. The apparatus as claimed in claim 1, comprising multiple egress queues, each egress queue to hold a subset of the processed data items, wherein each processing element is responsive to a destination indicator associated with the processed data item to direct the processed data item to a selected egress queue in dependence on the destination indicator when retiring the processed data item in the insertion procedure.

12. The apparatus as claimed in claim 11, wherein each processing element is responsive to the processed data item comprising at least two portions and the at least two portions having at least two different destination indicators to direct the portions to respective egress queues in dependence on the at least two different destination indicators when retiring the processed data item in the insertion procedure.

13. The apparatus as claimed in claim 3, further comprising:

storage for a dequeue serialization value, wherein, in each processing element, reserving the next available slot in the reorder buffer further comprises storing as an allocated slot number the identified next available slot, wherein each processing element is responsive to the dequeue serialization value being different to the allocated slot number to delay dequeuing the next data item from the ingress queue;

and wherein each processing element is responsive to the dequeue serialization value being equal to the allocated slot number to dequeue the next data item from the ingress queue and to update the dequeue serialization value.

14. The apparatus as claimed in claim 13, wherein updating the dequeue serialization value comprises incrementing the dequeue serialization value.

15. The apparatus as claimed in claim 13, wherein updating the dequeue serialization value comprises updating the dequeue serialization value with an incremented slot number.

16. A method of processing received data items comprising:

holding a sequence of the received data items in an ingress queue;

performing processing using multiple processing elements on the received data items to generate processed data items, wherein each processing element is responsive to an available status to reserve a next available slot in a reorder buffer comprising multiple slots and to start the performing processing on a next data item of the sequence of received data items in the ingress queue;

in each processing element, responsive to completion of processing of the next data item, reading a first value from a buffer change indicator and performing an insertion procedure for the processed next data item with respect to the reserved slot, wherein the insertion procedure comprises:

when the reserved slot is not a sequentially first reserved slot in the reorder buffer, storing the processed data item to the reserved slot, and attempting to update the buffer change indicator with a new value; and when the reserved slot is a sequentially first reserved slot in the reorder buffer, retiring to an egress queue for holding a sequence of the processed data items the processed data item and any further processed data items which are stored in slots which consecutively follow the reserved slot in the reorder buffer, and attempting to update the buffer change indicator with the new value, wherein attempting to update the buffer change indicator with the new value comprises reading a second value from the buffer change indicator, and when the second value is not equal to the first value, repeating at least the attempting to update the buffer change indicator with the new value step of the insertion procedure.

17. Apparatus comprising:

means for holding a sequence of received data items in an ingress queue;

multiple means for performing processing on the received data items to generate processed data items, wherein each means for performing processing is responsive to an available status to reserve a next available slot in a reorder buffer comprising multiple slots and to start the performing processing on a next data item of the sequence of received data items in the means for holding the sequence of received data items;

in each means for performing processing, responsive to completion of processing of the next data item, means for reading a first value from a buffer change indicator and means for performing an insertion procedure for the processed next data item with respect to the reserved slot, wherein the insertion procedure comprises:

when the reserved slot is not a sequentially first reserved slot in the reorder buffer, storing the processed data item to the reserved slot, and attempting to update the buffer change indicator with a new value; and when the reserved slot is a sequentially first reserved slot in the reorder buffer, retiring to an egress queue for holding a sequence of the processed data items the processed data item and any further processed data items which are stored in slots which consecutively follow the reserved slot in the reorder buffer, and attempting to update the buffer change indicator with the new value, wherein attempting to update the buffer change indicator with the new value comprises reading a second value from the buffer change indicator, and when the second value is not equal to the first value, repeating at least the attempting to update the buffer change indicator with the new value step of the insertion procedure.

* * * * *